March 19, 1963   R. BECKADOLPH ETAL   3,081,814
MACHINE FOR MAKING CARCASSES FOR VEHICLE TIRES
Filed Nov. 3, 1958   8 Sheets-Sheet 1

INVENTORS:
Richard Beckadolph
Hans Menell
Walter Niclas

March 19, 1963  R. BECKADOLPH ETAL  3,081,814
MACHINE FOR MAKING CARCASSES FOR VEHICLE TIRES
Filed Nov. 3, 1958  8 Sheets-Sheet 2

INVENTORS:
Richard Beckadolph,
Hans Menell
Walter Niclas

INVENTORS:
Richard Beckadolph
Hans Monell
Walter Niclas

March 19, 1963 R. BECKADOLPH ETAL 3,081,814
MACHINE FOR MAKING CARCASSES FOR VEHICLE TIRES
Filed Nov. 3, 1958 8 Sheets-Sheet 6

INVENTORS
Richard Beckadolph
Hans Menell
Walter Niclas

March 19, 1963   R. BECKADOLPH ETAL   3,081,814
MACHINE FOR MAKING CARCASSES FOR VEHICLE TIRES
Filed Nov. 3, 1958   8 Sheets-Sheet 7

INVENTORS
Richard Beckadolph
Hans Menell
Walter Niclas

INVENTORS
Richard Beckadolph
Hans Menell
Walter Niclas

United States Patent Office 3,081,814
Patented Mar. 19, 1963

3,081,814
MACHINE FOR MAKING CARCASSES FOR
VEHICLE TIRES
Richard Beckadolph, Hannover, Hans Menell, Ahlem, Hannover, and Walter Niclas, Altwarmbuchen, Germany, assignors to Continental Gummi-Werke Aktiengesellschaft, Hannover, Germany
Filed Nov. 3, 1958, Ser. No. 771,433
Claims priority, application Germany Nov. 2, 1957
4 Claims. (Cl. 156—394)

The present invention relates to a machine for making carcasses for pneumatic tires which machine is provided with a supporting stud or shaft carrying the drum for receiving the fabric layers forming the carcass. Such a machine furthermore comprises gripper elements movable radially with regard to said drum and adapted to grasp the marginal portions of the fabric layers and, while subjecting the same to tension, to fold said layers against the drum.

With heretofore known machines of this type, control cams are required in order to be able to fold the fabric layers under tension without creases. However, this can be obtained only if the control cam is designed in conformity with the contour of the drum, and if the gripper elements are adapted to carry out corresponding radial movements in the direction toward the supporting stud of the drum, and, if necessary, also movements in opposite direction.

It is an object of the present invention to provide a machine for making carcasses for pneumatic tires, which will considerably simplify heretofore known machines of the type involved.

It is also an object of the present invention to provide an improved machine for making carcasses for pneumatic tires which will be able to fold the fabric layers free from creases without the necessity of providing special control elements for controlling the gripper elements grasping the fabric layers.

These and other objects and advantages of the invention will appear more clearly from the following specification in connection with the accompanying drawings, in which.

*General Arrangement*

The carcass making machine according to the present invention is characterized primarily in that the folding of the fabric layers against the drum is effected by an axial movement of the drum in the direction toward the gripper elements and by a movement of the gripper elements in the direction toward the supporting stud or shaft while the holding force of the gripper elements during the working operation may be reduced. In this connection, it is advantageous to effect a reduction in the holding force of the gripper elements by an opening movement of the gripper elements.

In conformity with a further suggestion according to the present invention, it is of importance that the axial spacing between the drum and the gripper elements when occupying their starting position, is so great that the gripper elements will grasp fabric portions which after the working step has been completed will rest against the drum.

If with the machine according to the invention, the gripper elements are moved at uniform or non-controlled speed in the direction toward the supporting stud or shaft of the drum, in other words radially inwardly, the folding operation may due to the possibility of reducing the holding force of the gripper elements, be carried out as follows. When in starting position, the grippers or gripper elements grasp the marginal portions of the fabric layers to such an extent that they will also take up therebetween sections of the fabric layers which later are intended directly to contact the outer surface of the drum. If now the grippers are moved radially inwardly and the drum is moved in the direction toward the grippers, first the marginal portions of the fabric layers are folded against the drum while said marginal portions are firmly grasped by the grippers. The change in speed of the drum and/or of the grippers or the reversal of the movement as they are normally required near the end of the folding operation, now becomes superfluous inasmuch as a reduction in the holding force of the grippers will at a desired or required time allow the fabric layers somewhat to slide or slip in the grippers, whereas the grippers and the drum will now as before be able to continue their movement up to the completion of the working operation while maintaining their direction of movement.

*Structural Arrangement*

Figure 1:
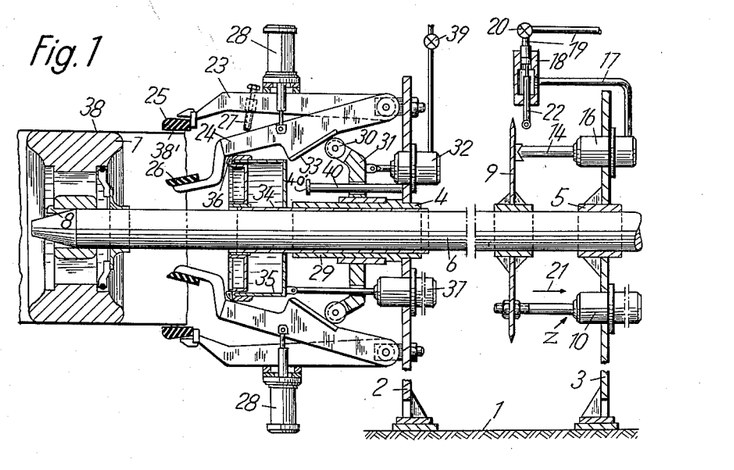
FIG. 1 represents a longitudinal section through a machine according to the invention for making carcasses for giant pneumatic tires while employing a high shoulder drum.

Referring now to the drawings in detail, the arrangement shown therein comprises two plate-shaped stands 2 and 3 connected to a foundation 1. Two bearings 4 and 5 in the stands 2 and 3, support a shaft or mandrel 6 for receiving and supporting a tire drum 7 designed as a high shoulder drum. Drum 7 is detachably mounted on supporting shaft 6 and, when the machine is in operation, is held in its respective position by a key-like hook 8. The rear end of shaft 6 has fixedly connected thereto a circularly shaped bend-resistant disc 9. This disc is adapted to be actuated by a hydraulic cylinder piston system generally designated Z which makes possible a displacement of shaft 6 and thereby an axial movement of drum 7. Cylinder 10 of cylinder piston system Z is shown in greater detail in FIG. 14 and, as will be seen therefrom, has a double acting piston 13 with piston rods 11 and 12 of different diameters respectively so that selectively the chamber in front or behind piston 13, if desired also both chambers, may be filled with a pressure fluid to produce different forces of working speeds.

Figure 6:
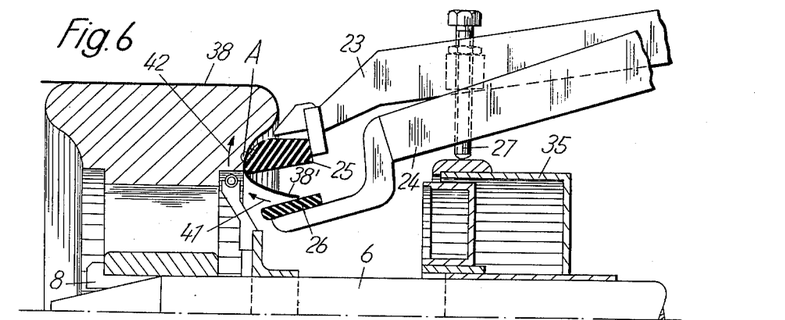
Figures 12, 15:
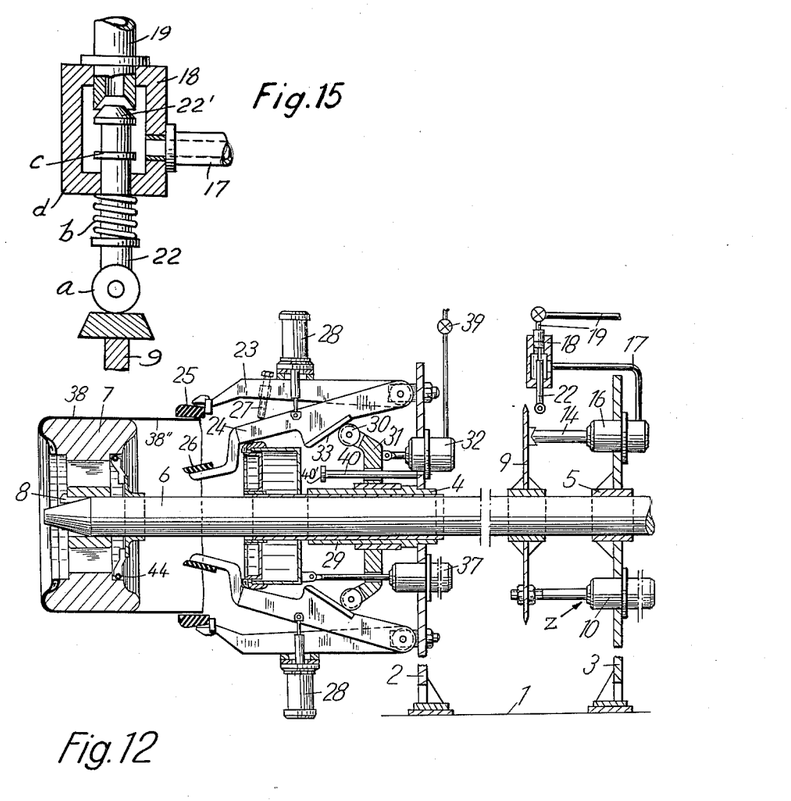
FIGS. 13 to 18 illustrate details of the machine according to the invention.
Figure 18:
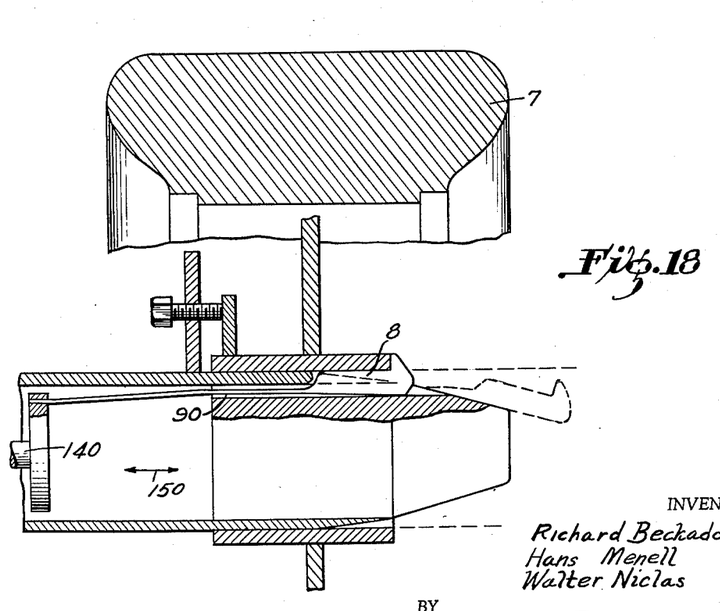

While the above mentioned key-like hook 8 does not form a part of the present invention, it may be briefly stated that this hook may be pulled into a longitudinal groove in mandrel 6 as shown in FIG. 12 or it may be moved by axial displacement thereof forwardly onto the cone of mandrel 6 as shown in FIG. 6. The movement of hook 8 may be effected by means of a rod 140 (see FIG. 18) through the intervention of a flexible spring 90 in the direction of the double arrow 150.

Figure 13:
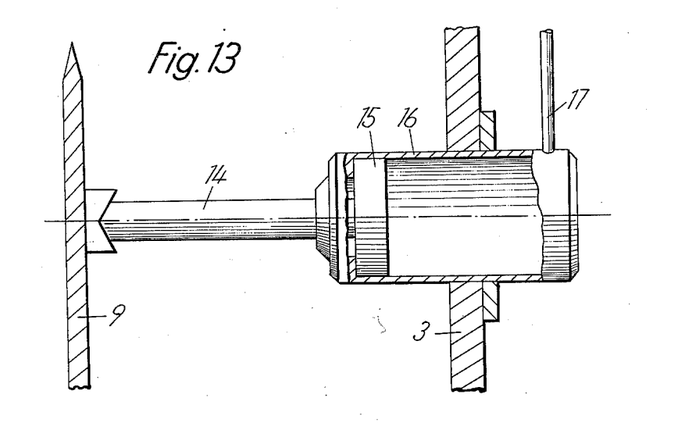

Stand 3 (FIG. 1) has connected thereto a detachable abutment 14 for disc 9 which in conformity with FIG. 13 is provided with a piston 15. Piston 15 is slidably mounted in a cylinder 16 for receiving a pressure fluid and is adapted due to the effect of the pressure fluid to occupy a position according to FIG. 13 or FIG. 1. A pipe or conduit 17 leads into cylinder 16. Conduit 17 communicates with a valve 18. Valve 18 is so designed that when occupying its position according to FIG. 1, it makes possible the access of pressure fluid into cylinder 16 which fluid is conveyed through conduit 19 and a further valve 20. The arrangement is such that the holding force of the abutment 14 is higher than the force which can be exerted by the cylinder piston system Z in the direction of the arrow 21. Valve 18 expediently designed as a control valve is adapted to be opened by spring pressure and may be closed by a stem 22 or disc 9 adapted to act upon stem 22. In this way, valve 18 may be closed in such a manner that the pressure fluid prevailing in cylinder 16 will at a desired point flow off only slowly whereby abutment 14 can yield in the direction of the arrow 21 while the drum speed produced by piston 13 will be reduced.

The operation of valve 18 will be particularly evident from FIG. 15 which illustrates a section through valve 18 on a scale somewhat enlarged over that of FIG. 1. In the position shown in FIG. 15, the cam $a$ has lifted the stem 22 so that a choking of the pressure fluid escaping through conduit 19 may be effected. The stem 22 with the valve head 22' is acted upon by a pressure spring $b$ continuously tending to move the valve head 22' into the valve opening position and to hold said valve head in said position. It is, therefore, evident that the thrust of said spring has to be overcome when the stem is lifted in order to move valve head 22 into its valve closing position. When the valve stem 22 has not yet been lifted, spring $b$ presses the stem 22 downwardly in which instance the flange $c$ rests upon the bottom of the valve housing $d$.

Stand 2 has linked thereto a great number of gripper pairs or grippers 23 and 24 distributed over the circumference of drum 7. This link connection is such that the grippers 23 and 24 can be tilted or moved radially with regard to the drum. The outer grippers 23 on one hand and the inner grippers 24 on the other hand are by means of elastic annular bands 25 and 26 of rubber or the like, interconected in such a way that a movement of grippers 23 and 24 will bring about a change in the diameter of the bands 25 and 26. Bands 25 and 26 are so designed that due to the tension therein they will always tend to pull the grippers 23 and 24 radially inwardly. Adjustable abutments, e.g. adjustable bolts 27, are connected to grippers 23. Grippers 23 and 24 in their turn communicate through small hydraulic cylinders 28 with each other in such a way that the radial distance of the bands 25 and 26 may be varied and thus a movement of the grippers may be effected.

Axially displaceably mounted on a sleeve 29 forming part of the bearing 4 is a basket 31 having its ends provided with rollers 30. Basket 31 is adapted to be moved by means of a power cylinder 32. Rollers 30 are in engagement with surfaces 33 of the levers 24; in other words levers 24 rest upon the rollers 30.

Figure 16:
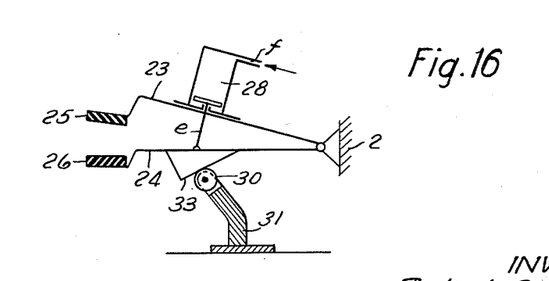

The operation of cylinder 28 will best be understood from FIG. 16. The cylinders 28 on the grippers 23 are fixedly connected thereto. Each cylinder 28 has reciprocably mounted therein a piston rod $e$ which is pivotally connected to the gripper 24. The movement of the grippers 23 and 24 is effected radially inwardly due to the pre-tensioned rubber bands 25 and 26. However, no movement of the members 23 and 24 at random is possible because the surface 33 rests on roller 30 in other words the roller 30 forms a firm counter bearing for the surface 33. The axial movement of the basket 31 with the rollers 30 thus determines the inward movement of the grippers 23 and 24. On the other hand, it is possible by means of piston rod $e$ to bring about an opening of the grippers. In the position shown in FIG. 16, gripper 24 rests on roller 30, whereas lever 23 is lifted away from gripper 24 by means of the cylinder piston system 28, $e$.

If now a pressure fluid is conveyed into cylinder 28 through conduit $f$, the tension of band 25 will be overcome so that the grippers will be opened as indicated in FIG. 16. Due to the movable support of cylinders 28, it is a matter of course that the feeding conduit $f$ has to be flexible and pressure resistant and that for instance a corresponding hose may be used for this purpose.

Between sleeve 29 and supporting shaft 6 there is mounted a likewise axially displaceable tube 34. The front end of tube 34 supports a bearing 35 for the bead cores 36 of the pneumatic vehicle tire to be built. By means of a further cylinder 37, the core placing or folding mechanism comprising the parts 34 and 35 may be moved in the direction toward drum 7.

The following operations are carried out by the machine: First, the fabric layers 38 are placed on drum 7, for instance, by winding the same on the drum by a rotative movement of shaft 6 while the latter is in its moved-out position. With the grippers 23 and 24 in opened position in conformity with FIG. 1, the folding operation is initiated by moving shaft 6 by means of cylinder 10 in the direction of the arrow 21 until the marginal portions 38' of the fabric are surrounded by band 25 as shown in FIG. 1. Inasmuch as the position of drum 7 with regard to grippers 23 and 24 and the bands 25 and 26 is of great importance because for the proper folding operation a certain axial distance between drum 7 and grippers 23 and 24 has to be maintained as precisely as possible, there is provided the abutment 14 above referred to. The piston 15 (FIG. 13) pertaining to the abutment occupies the position shown in FIG. 13 and is acted upon by a pressure fluid so that the force exerted thereby exceeds the force exerted by the cylinder piston system Z. The movement of the supporting shaft 6 in the direction of the arrow 21 into the position of FIG. 1 as brought about by the cylinder piston system Z is thus limited by the abutment 14.

By conveying a pressure fluid through valve 39 into cylinder 32, an axial movement of basket 31 in the direction toward drum 7 will be effected. This axial movement is, according to FIG. 2, continued until basket 31 rests against the head 40' of an abutment bolt 40 fixedly connected to stand 2. Due to the axial movement of the basket 31, grippers 24 move outwardly while overcoming the tensioning force inherent to band 25. Consequently, the marginal portions 38' are grasped by grippers 23, 24 or the bands 25, 26. When the position shown in FIG. 2 has been reached, valve 20 is actuated by remote control in conformity with the position of the grippers 23 and 24 and in such a manner that the pressure fluid in cylinder 16 will due to the effect of piston 13 be able to escape from cylinder 10. At the same time, valve 39 will be adjusted so that cylinder 32 will be relieved. As a result thereof, basket 31 will likewise move in the direction of the arrow 21. Consequently, grippers 23 and 24 will now be able to effect a radial movement inwardly dependent on the position of the basket 31. It is, of course, also possible to design the piston in cylinder 32 as a double acting piston in order to allow that the movement of basket 31 in the direction of arrow 21 may be effected by power actuated means. A particular control of cylinder 32 is not required. Cylinder 32 may rather determine a certain speed of basket 31 and thereby a uniform movement of grippers 23 and 24 radially inwardly.

Figure 17:
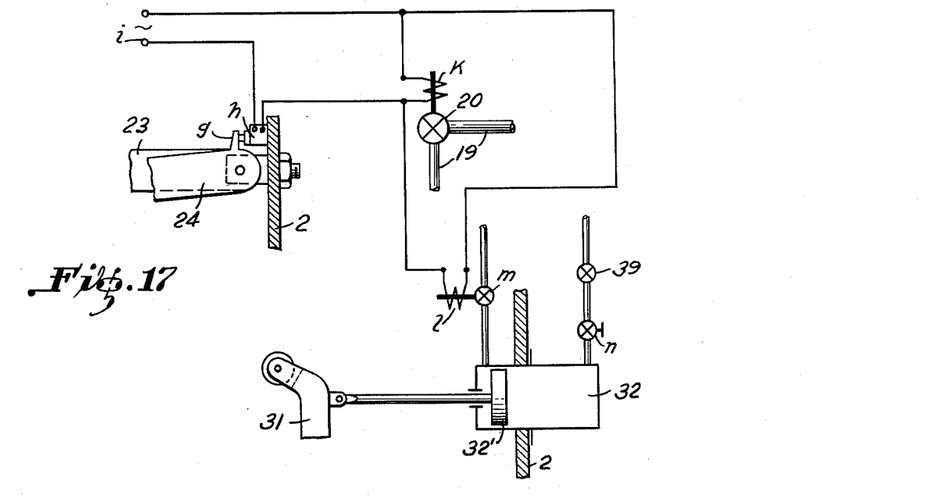

While various systems may be employed as the above mentioned remote control for actuating valve 20, a simple remote control is diagrammatically illustrated in FIG. 17. As will be evident from FIG. 17, gripper 24 is provided with a cam $g$ connected thereto and adapted to act upon an electric switch $h$. This switch $h$ when actuated by cam $g$ closes an electric circuit fed by a current source $i$. The control circuit comprises valve 20 operable by means of a relay $k$ and also comprises a valve $m$ operable by relay $l$ for actuating cylinder 32 and the piston 32' therein. Ahead of valve 39 there is provided a choke $n$ by means of which the return of piston 32' or its return speed can be adjusted.

Figure 2:
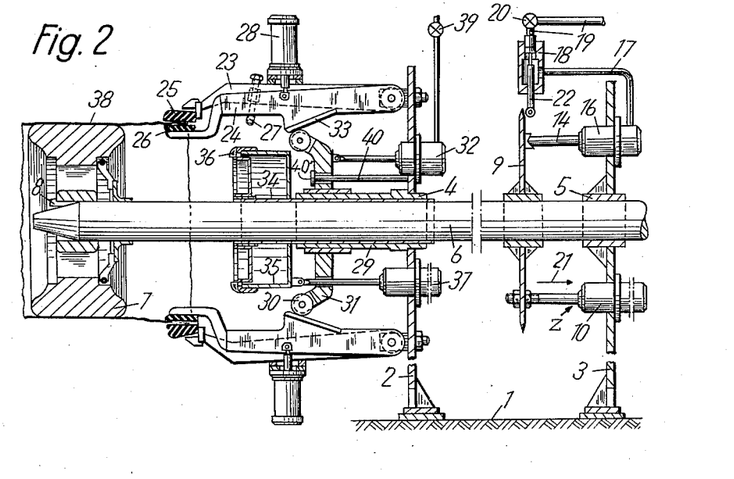
FIGS. 2 to 12 illustrate the machine according to FIG. 1 or parts thereof in various working positions.

When the position shown in FIG. 2 has materialized, cam $g$ strikes switch $h$. As a result thereof, the circuits for relays $k$ and $l$ are closed so that the same will be energized as a result of which valves 20 and $m$ will be opened. The opening of valve $m$ brings about the movement of basket 31 in the direction of the arrow 21. The speed of the basket and thereby the speed of the inward movement of grippers 23 and 24 will be determined by the escape of the pressure fluid from cylinder 32 through valves $n$ and 39.

The movement of basket 31 in the direction of the arrow 21 may be effected by the tension only of the bands 25 and 26. Preferably, however, the movement of the basket 31 is controlled by the movement of the piston 32' in the direction of the arrow 21 by means of the above mentioned valves m and n. In this instance, basket 31 practically forms a movable bearing which is followed by grippers 23 and 24 under the action of the tension bands 25 and 26.

In the position shown in FIG. 2, disc 9 actuates stem 22 so that the axial velocity of shaft 6 in the direction of the arrow 21 as produced by cylinder 10 will be reduced when the folding operation proper occurs which means when the grippers 23 and 24 move radially inwardly and thereby the fabric layers 38 while under tension are folded about the drum end faces. The delay in the movement of shaft 6 is brought about by a throttling of the pressure fluid escaping from cylinder 16, said throttling being effected by stem 22.

Figure 3:
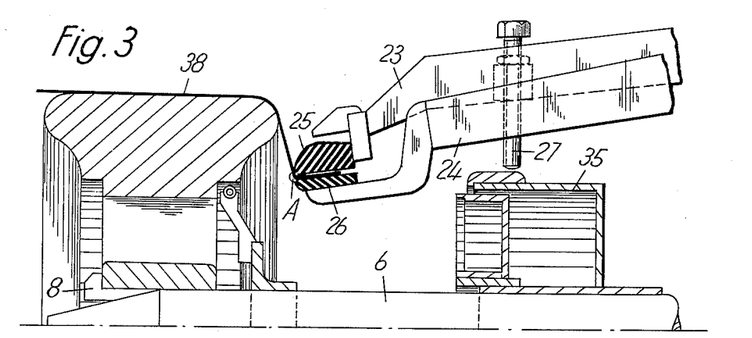
Figure 4:
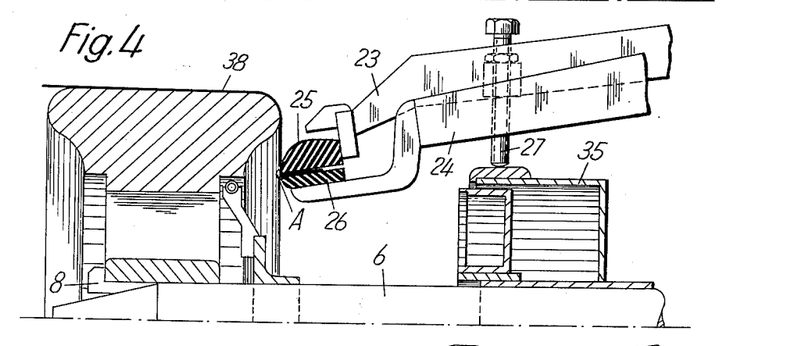

When the axial speed of drum 7 is reduced, first the position according to FIG. 3 will be reached. If now abutment 27 hits upon bearing 35, a further movement of gripper 23 in the direction toward the supporting shaft 6 cannot be effected any longer. Merely gripper 24 continues its movement in the direction toward the supporting shaft 6 so that the grippers will, according to FIG. 5, gradually open, and during the continued axial movement of drum 7, the marginal portions 38' will slide out of the bands 25 in the direction of the arrow 41 (FIG. 6). When the grippers 23 or the band 25 will be at a standstill, the axial movement of drum 7 in the direction of the arrow 21 will be continued until the position shown in FIG. 6 has been reached.

Figure 5:
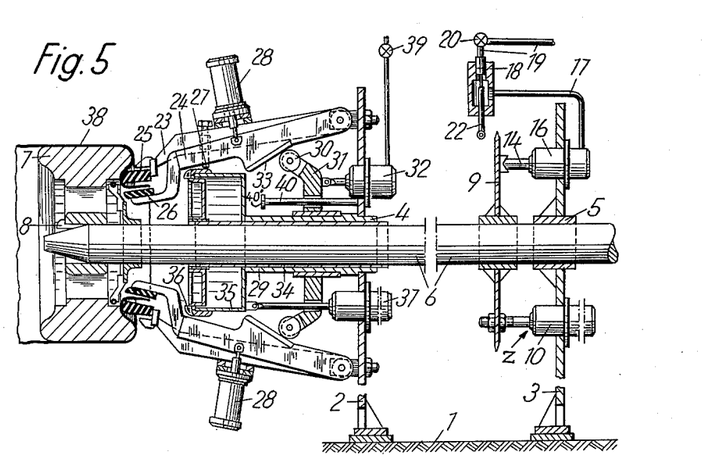

Inasmuch as the bands 25 and 26 consist of rubber, and since the opening of the grippers 23 and 24 is effected slowly, no sudden release of the fabric layers 38 can occur while the grippers 23 and 24 open in accordance with FIG. 5. The tension will rather in view of the friction be maintained to such an extent that also the last portion of the working operation will make possible a crease-free folding of the fabric layers 38. For operating the machine, it is furthermore of great importance that the fabric layers 38 are in comparison to other machines grasped over a shorter area which means that portion A (FIGS. 3 to 6) on fabric 38 will be at the front tip of these bands while the bands 25 and 26 firmly grasp the layers. If, however, the holding force of the bands 25 and 26 (FIG. 5) is considerably reduced, the part A moves in the direction of the arrow 42 (FIG. 6) since during the axial movement of drum 7 further surface portions of fabric 38 must be folded.

Figure 14:
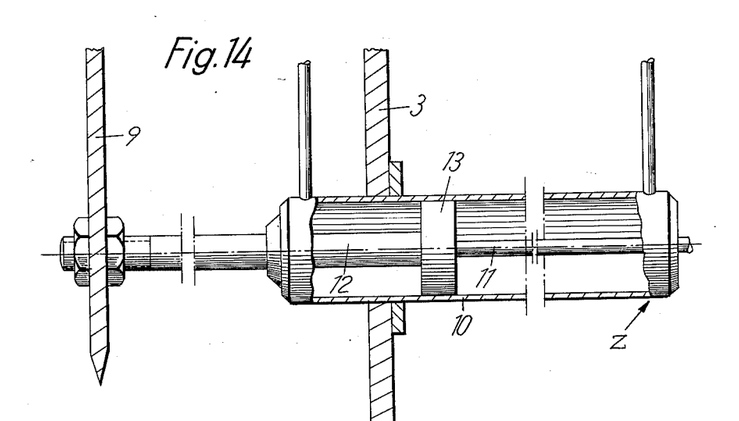

In this connection, it may also be mentioned that due to the opening of grippers 23 and 24 (see FIG. 5), expediently the force exerted by cylinder piston system Z is increased by a corresponding shifting of the pressure chambers according to FIG. 14.

Figure 7:
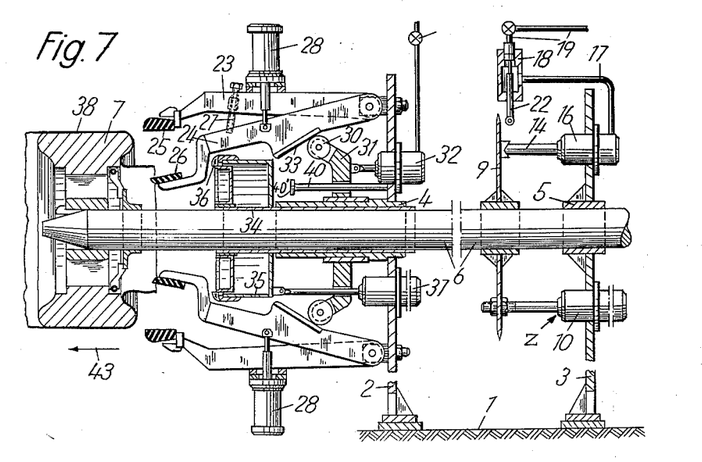
Figure 8:
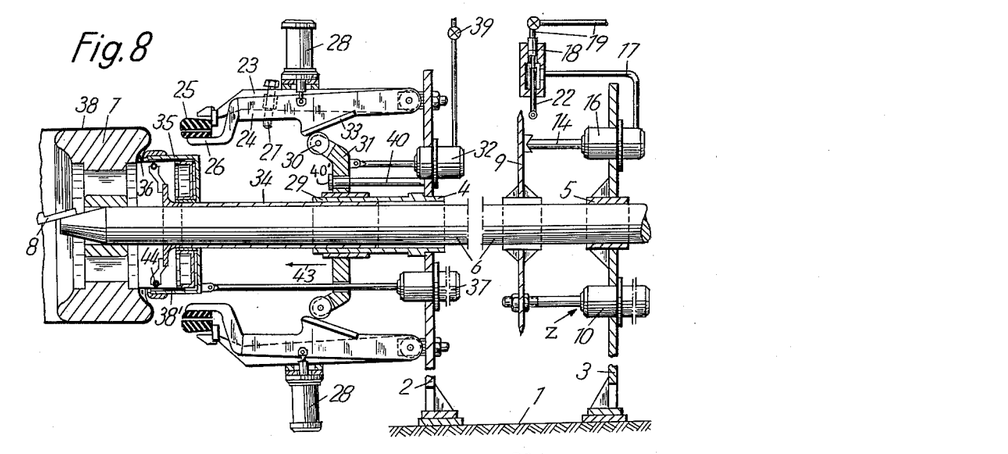

When the position according to FIG. 6 has been reached, drum 7 is by means of cylinder piston system Z, preferably by a fast traverse stroke, moved in the direction of the arrow 43 while it is advantageous at the same time to open the grippers by actuating cylinder 28 as has been illustrated in FIG. 7. Now basket 31 is likewise moved in the direction of the arrow 43 so that grippers 24 move outwardly. By means of cylinder 37, the bearing 35 may be caused to place cores 36 over the layers 38 on drum 7. Together with the axial movement of bearing 35, there is simultaneously effected a relative movement of drum 7 with regard to shaft 6 so that cores 36 will firmly rest on the fabric layers 38 while the marginal portions 38' are formed and smoothed expediently by means of an element 44 (FIG. 8) designed as screw spring and expediently journalled so that it can be rolled off.

Figure 9:
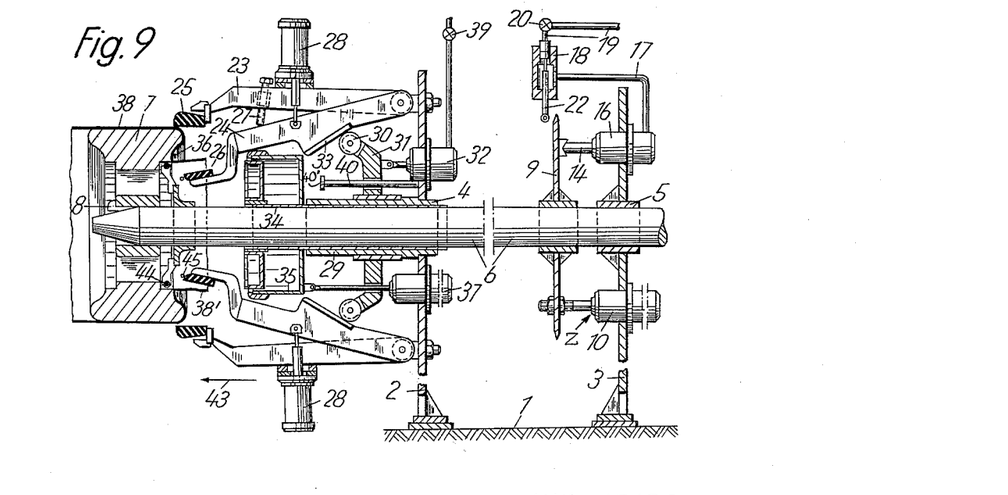

After the bearing 35 has again returned to its starting position, in conformity with FIG. 9, band 26 or gripper 24 is relieved by displacement of basket 31 so that the parts 24 and 26 will again be in the neighborhood of the supporting shaft 6. The outer grippers 23 with band 25 do not follow this movement in the direction toward the supporting shaft 6. Instead, the outer grippers 23 with band 25 are by cylinder 28 held on a large diameter, i.e., in the position shown in FIG. 9. By means of cylinder piston system Z, the radially supported marginal portions 38' are by means of element 44 guided over band 25 or gripper 24 to such an extent that element 44 contacts grippers 24. Thereupon drum 7 is by a retractive movement of hook 8 again moved in the direction toward element 44 to such an extent that drum 7 surrounds element 44. In this way, the marginal portions 38' are guided in a crease-free manner over band 26 or gripper 24.

The axially spaced marginal portions 38' of the fabric layers which are smoothed and so to speak ironed by element 44 are now by movement of grippers 24 or band 26 moved outwardly and expediently at the same time moved in the direction of arrow 43 by an axial movement of drum 7 corresponding to the contour of the drum. This movement is effected in such a manner that also the marginal portions 38' will be folded against drum 7 and against those fabric layers 38 which are already on the drum. According to FIG. 10, the guiding of the marginal portion 38' around the cores 36 and the folding operation of these fabric parts has been completed.

By a further movement of bearing 35 as brought about by cylinder 37, drum 7 is pressed off from its supporting shaft 6 at least to such an extent in the direction toward the conically-shaped end of shaft 6 that drum 7 can easily be grasped by means of a transporting element or the like.

After basket 31 and also bearing 35 have been returned to their starting position and after the grippers have carried out an opening movement, drum 7 is turned and placed upon shaft 6 in such a way that now the marginal portions 38" will be embraced by band 26. The folding of the marginal portions 38" will be effected in the same manner as described in connection with the marginal portions 38'.

It may also be stated that the fabric layers 38 must, of course, non-displaceably be mounted on drum 7 so that during the tensioning movement, the fabric layers cannot be pulled off. If the friction between the rubberized fabric layers 38 and drum 7 is not sufficient, special means, for instance sleeves embracing drum 7 and pressing the fabric layers 38 against the drum may be employed. Such sleeves are well-known and disclosed for instance in U.S. Patent application Ser. No. 463,252, now Patent No. 2,967,564, where sleeves of the type involved are designated with the numerals 25, 25'.

Those portions of disc 9 which come into contact with stem 22 and practically influence the axial movement of shaft 6 in the direction of the arrow 21 while at the same time the grippers 23, 24 move inwardly, may, of course, also be designed as cams or rails. It is merely essential that a reduction in the speed of drum 7 will be effected during the folding operation. In addition thereto, also a coarse control or throttling of the pressure fluid flowing from cylinder 16 may be effected by means of valve 20. Once valves 20, 39 and 18 have been properly adjusted, a precise working sequence has been determined. As mentioned above, it is expedient when adjusting valves 39, 20 and 18 to start from a certain adjustment of valve 39 inasmuch as the speed of the basket 31 depending thereon is expediently to be determined. The course of the various steps is, as has likewise been mentioned above, determined by remote control which actuates valve 20 in conformity with the position of grippers 23 and 24. Inasmuch as the considerably more powerful cylinder 16 is affected by valve 20 or since the forces acting upon piston 15 are greater than the forces produced by the cylinder piston system Z, cylinder 10 may remain filled with a pressure fluid when cylinder 32 is under pressure.

Figure 10:
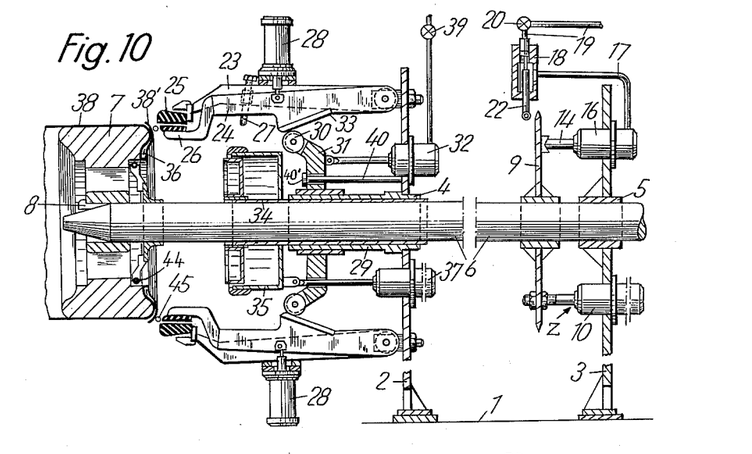
Figure 11:
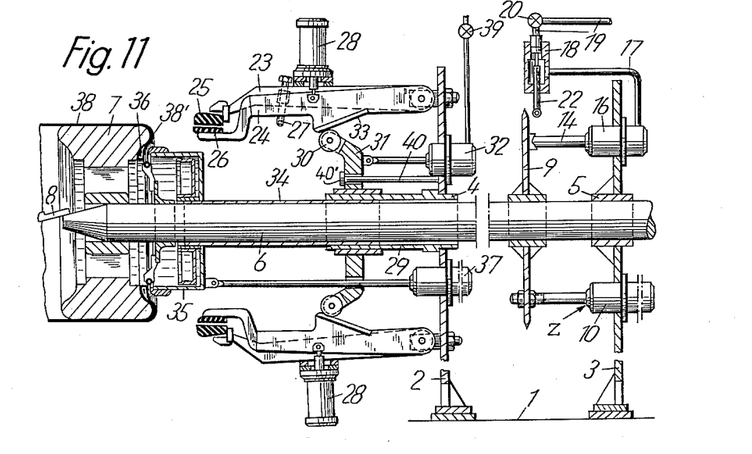

In order to avoid damage to the marginal portions 38' of the fabric layers and in order to assure a crease-free folding, the front end of grippers 24 or also band 25 as illustrated in FIG. 10 may be provided with roller bodies 45. Such roller bodies may be designed as screw springs adapted to roll or as rollers distributed over the circumference of band 26.

It is, of course, to be understood that the present invention is, by no means, limited to the particular constructions shown in the drawings but also comprises any modifications within the scope of the appended claims.

What we claim is:

1. In a tire carcass building machine having a frame, a drum reciprocable axially in the frame, and fabric forming means in the frame spaced from the drum, said fabric forming means comprising radially movable inner and outer gripper elements, first and second biasing means connected to said inner and outer gripper elements respectively and urging them inwardly, holding means adapted selectively to be made effective for temporarily holding said drum in predetermined spaced relation to said gripper elements, means for opening said gripper elements to receive therebetween a marginal portion of fabric placed on said drum, first actuating means operable to engage and move said inner gripper element outwardly to grip said marginal fabric portion between said gripper elements, second actuating means operatively connected to said drum and operable when said holding means is made ineffective to move the drum toward said gripper elements, third actuating means operatively connected to said first actuating means and operable to withdraw the latter from said gripper means to cause inward movement of the latter by said biasing means, control means operable in response to said outward movement of said inner gripper element into gripping relation with said outer gripper element to initiate operation of said second and third actuating means, and abutment means operable during inward movement of said gripper elements and the simultaneous movement of said drum toward said gripper elements, to abut and halt said outer gripper element while the inward movement of the inner gripper element continues, whereby the gripping force of said elements on said marginal fabric portion is reduced so that the latter slips between said gripper elements.

2. A tire carcass building machine according to claim 1, in which said holding means comprises, a cylinder connected to one of the frame and drum and a piston in the cylinder engaging the other of the frame and drum, valve means closeable for entrapping fluid in the cylinder to provide an abutment for the drum, and means responsive to the actuation of said control means for operating said valve into open position for releasing said abutment to permit movement of the drum toward the gripper element by said second actuating means.

3. A tire carcass building machine according to claim 2 in which a variable flow control valve is provided through which the fluid from said cylinder passes, and elements of a cam and follower carried by said drum and said control valve engageable during movement of the drum and operable for adjusting said control valve in response to movement of said drum thereby to control the rate of movement of said drum during movement thereof toward said gripper elements.

4. A tire carcass building machine according to claim 1 in which said third actuating means includes second piston and cylinder means, and means connected to said second cylinder to control the rate of fluid flow therefrom to thereby control the rate of inward movement of said gripper elements.

References Cited in the file of this patent

UNITED STATES PATENTS

| 2,488,863 | Haase | Nov. 22, 1949 |
| 2,904,099 | Niclas | Sept. 15, 1959 |

FOREIGN PATENTS

| 777,130 | Great Britain | June 19, 1957 |